INVENTOR:
BASIL EDGAR TEMPLEMAN
BY Kingsland, Rogers & Ezell
ATTORNEYS

April 13, 1965 B. E. TEMPLEMAN 3,177,767
ELECTRONIC TIMED SIGNALLING DEVICE FOR
USE IN A SOUND AND PICTURE PROJECTOR
Filed Feb. 1, 1961 3 Sheets-Sheet 2

INVENTOR:
BASIL EDGAR TEMPLEMAN,
BY Kingsland, Rogers & Ezell
ATTORNEYS

INVENTOR:
BASIL EDGAR TEMPLEMAN,
BY Kingsland, Rogers & Ezell
ATTORNEYS

United States Patent Office 3,177,767

Patented Apr. 13, 1965

3,177,767

ELECTRONIC TIMED SIGNALLING DEVICE FOR USE IN A SOUND AND PICTURE PROJECTOR

Basil E. Templeman, Memphis, Mo., assignor to Armstrong-Templeman, Inc., Abilene, Kans., a corporation of Kansas

Filed Feb. 1, 1961, Ser. No. 86,410

11 Claims. (Cl. 88—28)

This invention relates to a control network, and more particularly to a control network in which a tape recorder connected into the network controls the performance of a useful system which receives signals from the tape recorder.

The embodiment described as illustrative of the present invention contemplates the association of a tape recorder with a slide projector. The tape recorder passes a tape across its head which contains the various documentary information that coincides with the particular set of slides being shown by the automatic slide projector. At the end of each set of information on the tape passing over the head, a five second pause or silent time will pass the tape head causing the circuit to transmit an advance pulse to a stepper relay network. The stepper network causes the slide projector automatically to advance to the succeeding slide to be projected. Thereafter, the messages and advances will continue until the end of the entire set of messages reaches the tape. At this time, a ten second pause or silent time on the tape causes the reset network to operate to send a pulse to a reset coil, which will, in turn, initiate a resetting network in the slide projector to return the slide projector to starting condition.

It is accordingly a primary object of this invention to provide a control network which will perform the above mentioned operations.

The above arrangement is also presented in a modification wherein a subsidiary network incorporates means to automatically synchronize the audio section with the visual section of the projector, should one of those sections fall behind the other. Therefore, another object of the invention is to provide means for automatically synchronizing a series of audio messages with a corresponding series of visual messages.

It is an additional object of the invention to provide means for preventing the continual shifting of the projector through more than one slide change during the interval between audio messages.

Further objects will be apparent from the description of the invention.

It might be useful to refer to the block diagram for a general understanding of the invention.

A tape head has its signal fed into a pre-amplifier. That signal is amplified and fed to a speaker for audio conversion and reproduction of the electrical impulses. Since the tape carries documentary messages corresponding to the slides which are being projected by a slide projector, those messages will be heard by listeners through the medium of the speaker. The same signal is fed by the pre-amplifier into another amplifier. The signal from this amplifier is fed to a timing means. If a five and one-half second silent section crosses the tape head, that silent section will be sufficient to cause the three and one-half second timer to activate its trigger. The trigger will then cause relays to operate a stepper mechanism, which will send a slide change pulse to a mechanism for operating the slide projector to advance to a succeeding slide.

If a ten second silent time passes over the tape head, the resulting extended lack of signal to the seven and one-half second timer will cause that timer to operate its trigger. A clipper may be provided between this timer and its trigger to control the signal to the tube in a manner well known in the art. The seven and one-half second trigger will operate a relay mechanism to send an impulse to a reset means for resetting the slide projector. This resetting signal will occur at the end of all of the tape messages of the series.

In the following, values of circuit components are to be considered typical rather than limiting.

Figure 2:
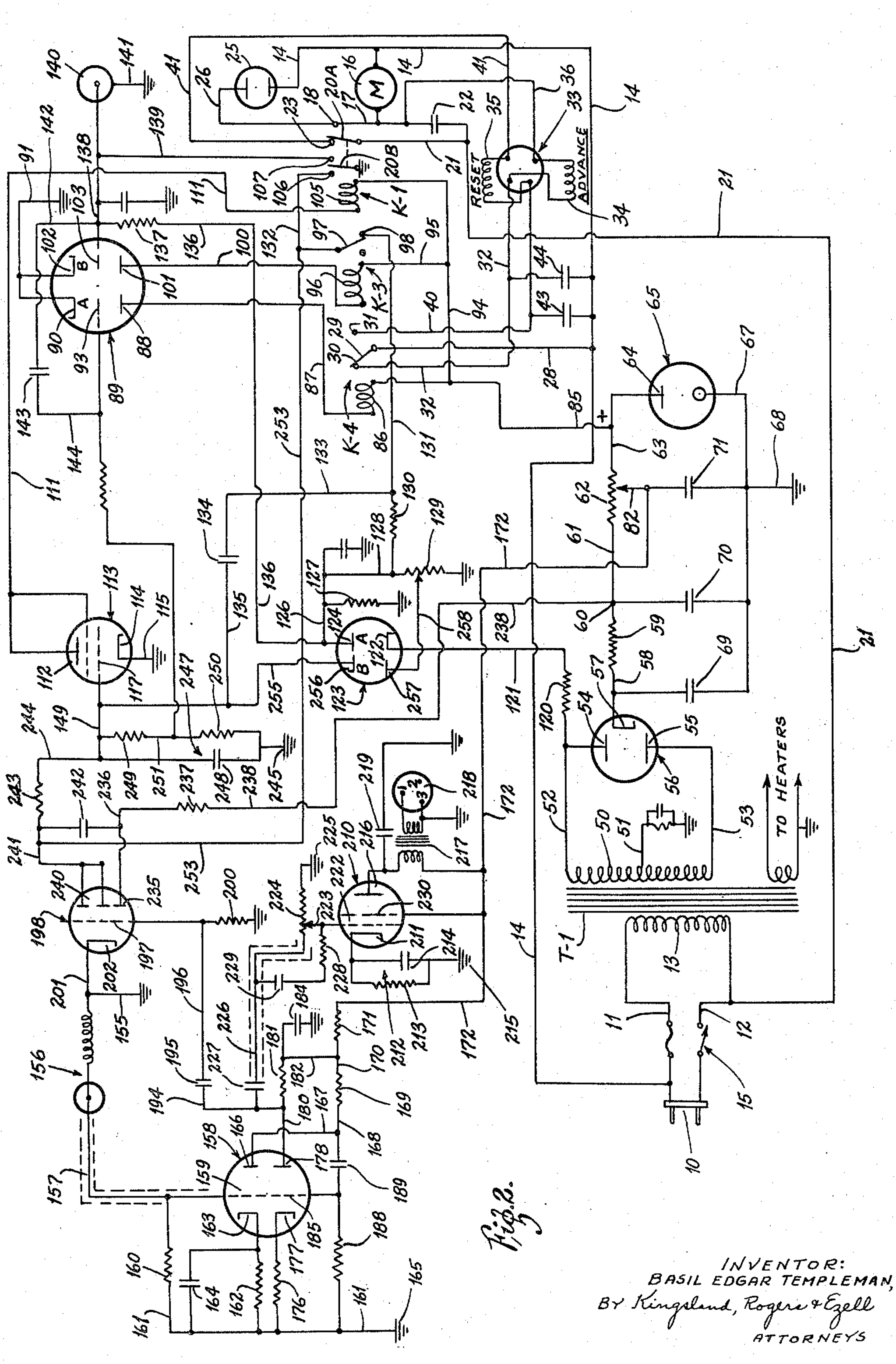
FIGURE 2 is a schematic wiring diagram of the modification of FIGURE 1.

Referring to the drawings, and particularly to FIGURE 2, an A.C. power source is indicated by the plug 10, which has wires 11 and 12 across which a primary 13 of a transformer T–1 is connected. Also connected to the wire 11 is a wire 14 that extends to a motor and relay control network shown at the right of the diagram. A main switch 15 is provided, to control the supply of electricity to all parts of the system.

The motor and relay network has an electric motor diagrammatically illustrated at 16, connected at one side to the wire 14, and at the other side to a wire 17 leading to a switch terminal 18 that is part of a relay switch means K–1. The relay switch has a movable armature 20–A connected by a wire 21 back to the other power line 12. Thus the motor 16 is connected across the power lines, with the switch 20–A in series with it. The armature 20–A of the switch moves to the contact 18 or to a contact 23, with which latter it is shown as engaged. A capacitor 22 is connected across the switch 18–20.

The wire is also connected to an A.C. receptacle 25 for uses to be described. A wire 26 connects the receptacle to the switch terminal 18, through which the circuit for the receptacle may be completed to the other line 21 by the switch arm 20–A.

The wire 14 connects to a wire 28, leading to the armature 29 of a relay switch K–4. The armature 29 is movable between terminals 30 and 31, it being shown in contact with the terminal 30. That terminal 30 is connected by a wire 32 to a connector 33 for a conventional automatic slide projector, that has a slide advancing stepping coil 34 and a resetting coil 35 diagrammatically represented. The other end of the resetting coil 35 is connected by a wire 36 to the wire 17 of the motor circuit, and the terminal 18.

Returning to the relay switch K–4, the other terminal 31 is connected by a wire 40 to the relay connector 33, the wire 40 being connected to one end of the resetting coil 35. The other end of the resetting coil 35 is connected by a wire 41 to the terminal 23 of the relay switch K–1, whence its circuit may be completed to the other line wire 21 if the armature 20–A is in the position shown.

Appropriate capacitors 43 and 44 can be connected across from the line 14 to the opposite wires 32 and 40 of the advancing and resetting circuits.

The primary 13 of the transformer T–1 has a secondary 50 with a center tap 51 that is grounded. The two lead wires 52 and 53 of the secondary 50 are connected to two plates 54 and 55 of full-wave rectifier 56 that may be a 6X4 tube. The cathode 57 of the tube 56 is connected by a wire 58 through a resistor 59 (1K) to a junction 60. From the junction 60 a wire 61 connects to a resistor 62 (3K) from which a wire 63 leads to a plate 64 of a voltage regulator tube 65 such as an OA2. The regulator tube 65 has its other electrode connected to a wire 67 that is connected to ground at 68. The circuit also contains appropriate capacitors 69, 70 and 71 (20 mfd. each) as indicated.

The wire 63 is connected to a wire 85 that leads to a coil 86 of the relay switch K–4. The coil 86 is the actuating element of the relay, the armature of which is the switch arm 29. When the coil 86 is energized the switch arm 29 is drawn to the left, to connect the two wires 28 and 32. When the coil 86 is deenergized, the switch 29 will connect the wires 28 and 40.

The other end of the coil 86 is connected by a wire 87 to one plate 88 of a tube 89 that may be a 12AU7 dual triode tube. The cathode 90 cooperating with the plate 88 is connected by a wire 91 to ground. This left side of the triode is designated 89–A. Thus, the coil 86 of the relay K–4 may be connected across the regulator tube 65, with the triode 89 acting as a valve or switch. Conductivity between the plate 88 and the cathode 90 is regulated by a first grid 93 to be described hereafter.

Returning to the wire 85 which leads from the cathode side of the full wave rectifier 56 after the resistor 62, there is a wire 94 leading from a mid point of the wire 85 and connecting to a wire 95 that leads to the coil 96 of a relay K–3. This coil 96 operates a switch armature 97. When the coil 96 is energized, the switch 97 is opened against a stop. When the coil 96 is deenergized, the switch 97 is closed into the position illustrated, against a switch contact 98. Its function in the circuit will be described hereafter.

The other side of the relay coil 96 of the relay K–3 is connected by a wire 100 to the plate 101 of the tube 89. The cathode 102 of this side B of the tube 89 is also connected to the ground wire 91. Conductivity of this side of the tube between the plate 101 and the cathode 102 is controlled by a grid 103, the circuitry for which will be described hereafter. The coil 96 of the relay K–3 is thus also connected across the regulator tube 65, under control of the tube 89 acting as a valve or switch.

Again returning to the wire 85 from the wire 63 at one side of the regulator tube 65, the wire 85 and the branch 94, the wire 94 continues to a relay coil 105 of the relay switch K–1. This coil 105 operates a dual relay switch made up of arms 20A and 20B. When the coil 105 is energized, the relay switch arm 20A is drawn to the switch contact 23, and the arm 20B is drawn to the contact 106, as illustrated. When the coil 105 is deenergized, the arm 20A moves to the contact 18, and the arm 20B moves to the contact 107. The switch arm 20B is grounded.

The other side of the coil 105 of the relay K–1 is connected by a wire 111 to the plate 112 of a normally conducting tube 113 that may be a 6AK6 tube. The cathode 114 of this tube is grounded at 115. Its conductivity is regulated by a grid 117, the circuit for which will be described later. The circuit arrangement puts the coil 105 of the relay K–1 across the regulator tube 65, subject to the tube 113 acting as a valve N switch. The tube 113 is the motor control tube.

The three relays K–1, K–3, and K–4 constitute the mechanism controlled by the present control apparatus, they being, in a sense, part of the motor 16, the advancing coil and the resetting coil, since where they operate, these last named devices operate correspondingly. The two switching or valving sides of the tube 89, and that of the tube 113, constitute selectively operable switches for selecting operation of the ultimately controlled apparatus. The grids of these tubes constitute the means for controlling the operation of the switching tubes. The apparatus for controlling the grids will now be described.

Returning to the secondary 50 of the transformer T–1, the lead 52 is connected through a resistor 120 (47K) that, in turn, is connected by a wire 121 to a cathode 122 of a tube 123 that may be a 6AL5 tube. The plate 124 corresponding to the cathode 122 in side A of the tube 123 is connected to several circuit branches, as follows: The plate 124 is connected by a wire 126 to a resistor 127 (100K) and ground. Additionally, it is connected by the wire 126 to a wire 128, that is connected to a resistor 129 (25M) that is grounded. It also extends through a lower value resistor 130 (100K) to a wire 131. The wire 131 is connected to the contact 98 that can be closed by the relay K–3, and it may connect to ground by a wire 132 connected to the terminal 106 of the switch 20B.

The wire 131 is connected also by a wire 133 to a condenser 134 (.1 mfd.), the other side of which is connected by a wire 135 to the grid 117 of the tube 113.

Returning to the cathode 124 of the tube 123, another wire 136 extends therefrom through a resistor 137 (10M) to a junction with a wire 138. The wire is connected to the grid 103 of the tube 89, so that the grid-cathodes of the right side of the tube 89 are constantly connected across the resistor 127, with which the resistor 130 is sometimes in parallel. The wire 138 is also connected to a wire 139 that leads to the terminal 107 of the grounded switch 20B of the relay K–1. The wire 138 is also connected to a manual push button switch 140 that is grounded at 141 so that, when the push button is pressed, the wire 138 and the grid 103 are grounded, but when the push button is released that ground connection is broken. A wire 142 connects the wire 138 to a condenser 143 (.01), the other side of which is connected by a wire 144 to the grid 93.

It is fairly evident to this point that the tube 123 produces a negative potential at the plate 124, and such negative potential is normally applied to the grid 103 of the tube 89, to keep the tube 89B non-conductive, on that side, unless either the push button 140 is grounded or the normally energized relay K–1 is deenergized to produce a grounding through the switch arm 20B. When the right divide of the tube 89 is non-conductive, the coil 96 of the relay K–3 is released, and there is ground potential on the condenser 134.

It is here predicted that the overall cycling of the apparatus can be started by depressing the push button 138, when the relays K–1 and K–4 are energized, and the relay K–3 is deenergized. That will put the motor 16 into operation. It is an object of the invention to control the continued operation of the motor circuit by an audio-derived signal received as a result of starting the motor circuit. This is done by applying an audio-generated potential to the grid 117 of the tube 113.

The illustrated source of the audio signal is a sound source such as a tape recorder pick-up, by way of a pre-amplifier. It will be understood that other sources of audio signals can be used, such as a microphone or the like, and that, while audio signals are especially significant in the present combination, signals derived from other than sound may sometimes be used.

A gound connection 155 (near the upper left of the drawing) is connected to a tape-recorder pick-up 156. This tape recorder (diagrammatically illustrated) is driven by the motor 16. An audio-derived signal from the pick-up in conducted through a shielded conductor 157 to a two-stage pre-amplifier of conventional connections, including a tube 158, which is a 12AX7 as illustrated. Briefly, in the pre-amplifier, the wire 157 is connected to the first grid 159 of the tube 158 and also through a resistor 160 (1M) to a wire 161. The wire 161 is connected through a resistor 162 (1K) to the cathode 163, there being a capacitor (20 mfd.) connected around the resistor, as conventionally the wire 161 is grounded at 165.

The plate circuit for the first half of the tube 158 includes the cathode 163. A plate 166 is connected to a wire 167. The wire 167 connects into a wire 168. The wire 168 is connected to a resistor 169 (470K), the other side of which is connected by a wire 170 leading into a resistor 171 (22K) thence to a wire 172 and back to the divider 82 that leads by way of the resistor 62 (3K) back into the power pack.

Reverting to the tube 158, the grounded wire 161 is connected through a resistor 176 (2.2K) to the second cathode 177. The cathode 177 cooperates with a second plate 178 connected to a wire 180. The wire 180 is connected to a resistor 181 (220K) and thence by a wire 182 to the wire 170. The resistor 181 is also grounded through a capacitor 184 (20 mfd.).

The second grid 185 is connected across the first output circuit. To this end, the wire 161 is connected to the grid 185 through a grid resistor 188 (1M), and a capacitor 189 (.02 mfd.) connects the grid 185 with the wire 168.

The output wire 180 of the lower plate circuit of the tube 158 is also connected by a wire 194 through a capacitor 195 (500 mmf.), and a wire 196, to the grid 197 of the tube 198. The grid 197 is also connected through a resistor 200 (1M) to ground. The ground connection 155 is connected by a wire 201 to the cathode 202 of the tube 198.

By the foregoing arrangement, the audio signal obtained from the pick-up 156, amplified through the two-stage amplifier 158 is applied to the grid-cathode of the tube 198.

Before treating the output circuits of the tube 198, it is noted that there is a conventional speaker circuit so that the audio signal is amplified and converted into sound. This speaker circuit revolves around the 6AQ5 tube 210. That tube has a cathode 211 connected through a resistor-capacitor network 212, having a resistor 213 (390) and a parallel capacitor 214 (20 mfd.), the network being grounded at 215. The tube 210 has a plate 216 that is connected through the primary of a transformer 217 and thence into the wire 172. The secondary of the speaker transformer 217 is connected conventionally to a speaker connection 218. The plate 216 is also bypassed through a capacitor 219 (.005).

The grid 222 of the tube 210 is connected across the output of the tube 158. The grid 222 is connected to a divider 223 and into a resistor 224 (2.5M). The resistor 224 is connected at one end to ground 225, and at its other end by a shielded conductor 226, through a capacitor 227 (.05) to the wire 194, and by the wire 180 to the plate 178. A resistor 228 (470K) and capacitor 229 (500 mfd.) are connected across the segment of the resistor 224 that is ungrounded.

The other grid 230 is connected into the wire 172. The foregoing is a conventional speaker arrangement, and is here illustrated because the combination provides related sound and sight functions.

The output signal from the two-state pre-amplifier 158 is applied both to the speaker amplifier tube 210 and to the control tube 198, previously mentioned.

The output circuit of the tube 198, which is illustrated as a 6AV6, includes a main plate 235, connected by a wire 236 to a resistor 237 (470K), and thence by a wire 238 to the power rectifier arrangement, at junction 60. The two diode plates 240 are connected by a wire 241. A capacitor 242 (.02) is connected across the wires 236 and 241, so that an A.C. component of output can be conducted across the capacitor. The wire 241 is also connected through a resistor 243 (1M) to the grid 117 of the tube 113, with a dual time constant network interposed.

A ground 245 connects into the dual time constant network 247, made up of a capacitor 248 (.22), and two resistors 249 (10M) and 250 (2.2M) connected in series by a wire 251, the capacitor and series resistors being in parallel between the ground 245 and the wire 149. The wire 149 is connected to the grid 117 of the tube 113. This puts the time constant network and the cathode-grid of the tube 113, across the audio-modulated output of the tube 198.

The wire 241 is connected by a wire 253 to the wire 132 and the contact 106 of the relay switch K–1, so that when the relay K–1 is energized, the grid 117 is grounded. The wire 253 is also connected to the wire 176, so that when the relay K–3 is de-energized, a certain negative potential is applied to the grid 117.

The grid 117 of the motor control tube 113 is connected by the wire 135 to a wire 255 and the plate 256 of the B side of the dual diode 123. The cathode 257 of this tube is connected by a wire 258 to a tap on the resistor 129 (2.5M) and thence to ground. This forms a clipper circuit that limits the potentials applied to the grid 117.

Figures 1, 4:
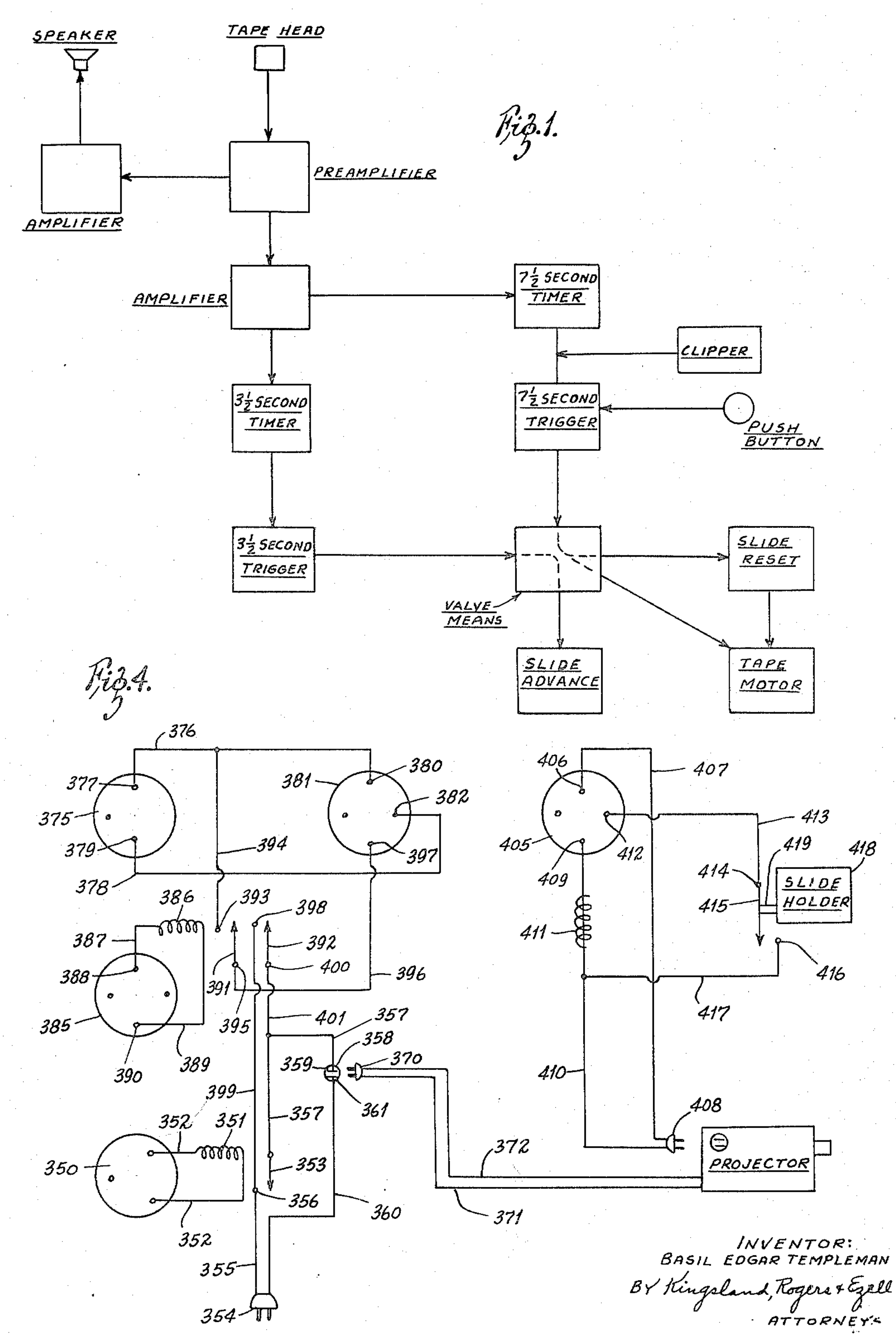
FIGURE 1 is a block diagram of one form of the invention.
FIGURE 4 is a schematic diagram of a sub-chassis operable with the modification of FIGURE 3.

*Operation of FIGURES 1 and 2*

The entire apparatus is under control of the master switch 15. When it is closed, A.C. electric power is supplied to the appliance circuits for making the motor 16, the accessory socket 25, and the automatic slide projector operable when appropriate switches are operated.

Power is available by the wire 14 through the motor 16 and the accessory socket 25 to the switch 20A of the relay K–1. From the other side of the switch the wire 21 completes the connections back to the power source. The switch 20A is normally open with respect to the contact 18 when the apparatus is at rest.

Power is also available by the wire 28 to the switch 29 of the relay K–4, and thence either by the wire 32 to the advancing coil 34 for the slide projector, and the wire 36 back to the switch 20A, or by the wire 40 to the reset coil 35 and the wire 41 to the switch 20A. Normally, when the machine is at rest, the relay K–1 is energized, and the switch 20A is closed on the contact 23, so that the reset coil could be energized but the advancing coil could not. At the same time the relay K–4 is normally energized, so that the switch 29 is closed as illustrated, keeping open the resetting coil circuit, but enabling the advancing coil circuit to be closed.

The power circuit is energized through the center-tapped transformer T–1, and the full wave rectifier 56. Current flows from the transformer T–1 through the center tap 51, the ground 68, the wire 67, the regulator tube 65, the plate 64, the resistor 62, the wire 61, the resistor 59, the cathode 57, the plates 54 and 55, to the transformer.

The tube 89A is at this time conductive, because the grid 93 is at ground potential, by ground 245. Similarly, the ground 245 gives ground potential to the grid 117 and causes the tube 113 to conduct. The circuit for the coil 86 of the relay K–4 is energized by the ground 91, the cathode 90 of the tube 89A, the plate 88, the wire 87, the coil 86, the wire 85, and thence to the full wave rectifier 56 and the transformer T–1. This holds the switch arm 29 as shown. The circuit for the coil 105 of the relay K–1 is energized by the ground 115 of the tube 113, thence the cathode 114, the plate 112, the wire 111, the coil 105, the wire 94, the wire 85, and the rectifier and transformer T–1.

Under the above outlined conditions, the tube 89B is held non-conductive, and the coil 96 of the relay K–3 accordingly deenergized, because the grid 103 is kept negative. The grid 103 is controlled by the tube 123A. Current from the transformer 50 can flow through the wire 52, the resistor 120, the cathode 122, the plate 124, the wire 126, the resistor 127, ground, and the center tap 51. This establishes a negative potential at the plate 124. There is also a circuit to ground, at this time, from the plate 124, the wire 126, the wire 128, the resistor 130, the wire 131, the switch 97, the wire 132, the switch 20B, and ground. This circuit can raise the potential, but does not change the non-conducting condition of the tube 89B.

To start the cycle, the starting switch is closed by momentarily depressing the push button 140, immediately grounding the grid 103, and rendering the tube 89B conductive. The quick change of the potential on this grid 103, sends a surge of current through the wire 142, the condenser 143, the wire 144 and the grid 93.

When the tube 89B conducts, a circuit is closed from the ground 91, the cathode 102, the plate 101, the wire 100, the coil 96 of the relay K–3, the wire 95, the wire 94, the wire 85 and back through the rectifier to the transformer T–1. Energizing the coil 96 opens the switch 97, thus opening the bleeder circuit, and causing negative potential from the plate 124 of the tube 123A to be applied momentarily by way of wires 126 and 131 to the grid 117 of the tube 113 and the time network 247, until the condenser 134 becomes charged. The negative charge on the grid 117 stops conductivity of the tube 113, and it remains non-conductive for a predetermined time interval, fixed by the network 247.

When the tube 113 stops conducting, the coil 105 of the relay K–1 is deenergized, so that the switch 20A opens from the contact 23 and closes onto the contact 18, while the switch 20B opens from the contact 106 and closes on the contact 107.

Closing the contact 18 starts the motor 16. Closing the contact 107 holds the ground onto the grid 103 despite release of the push button, or reopening of the starting switch.

When the motor 16 starts, the tape or other recorder is set into operation, and an audio signal is produced within a predetermined time interval of, say, five seconds. This signal is amplified by the preamplifier 158 and is delivered to the speaker by the connector 218, so that an audible message can be delivered. At the same time, the audio signal is supplied to the grid 197. It is amplified, and the A.C. component is delivered by the condenser 242 to supply a negative potential to the time network 247 and the grid 117. This negative potential will keep the tube 113 nonconductive.

At this time, the intermittent film projector is illuminated by way of the accessory outlet 25, and the appropriate message for the film transparency (or equivalent) is being projected onto a screen or the like. As long as the audio message and signal persists, the operating switch 20A will remain in contact with the contact 18, keeping the projector illuminated, and the recorder motor in operation.

There are a series of audio messages, usually on a tape or a record. When one ends, there is a certain time gap before the next one starts. This gap may be five seconds. When the tape is completely cycled through the final audio message, there will be a longer gap of about ten seconds.

The time constant network 247 has a dual timing function. The audio signal applied by the wire 244 charges the condenser 248, and this charge remains throughout the audio message. When the audio message stops, the time-constant network holds a potential on the grid 117 of the tube 113, and on the grid 93 of the tube 89. After a shorter interval of, for example, three and one-half seconds, the negative charge on the grid 93 ends, and that grid goes positive. This interval is shorter than the gap between two successive messages on the tape record, so that the tube 89A will resume conducting after each message. After a longer interval of, for example, eight seconds, which is greater than the gap between successive messages, but less than the gap between the last and first messages, the negative bias on the grid 117 decays, and the tube 113 resumes conducting.

The resumption of conducting by the tube 89A re-energizes the coil 86 of the relay K–4 from the ground 91 to the rectifier 56 and transformer T–1. When energized, the coil 86 draws the arm 29 over to the contact 30. At this time the tube 89B remains non-conducting, owing to the longer time interval affecting the grid 117 of the tube 113. Consequently the switch 20A remains to the right. Therefore, a circuit is closed when the tube 89A becomes conducting prior to the tube 113 to energize the *advance* coil 34 as follows: the wire 14, wire 28, arm 29, contact 30, wire 32, connector 33, advance coil 34, wire 36, wire 17, contact 18, switch arm 20A, and wire 21. Thereupon the advance coil 34 causes the projector to withdraw the film then in place, and advance a new film into place and project the image therefrom. This action is completed prior to beginning of a new audio message. When the new image is projected, an appropriate new audio message is delivered, and caused to provide a negative bias on the grid 117 of the tube 113 to hold it non-conductive, and on the grid 93 of the tube 89, rendering it again non-conductive. Also the network 247 is recharged.

At the end of the record cycle, the audio signal will remain off for a longer period. This first results in an operation of the advancing coil of the projector as before. However, the new audio signal is not fed into action by the synchronous motor, so that after a lapse of about seven seconds, the negative bias on the grid 117 decays to permit that tube again to conduct.

Thereupon, both tubes 89A and 113 are conducting so that relays K–4 and K–1 are energized. This holds the switch arm 29 to the left, the switch arm 20A to break the motor circuit and close the contact 23, and the arm 20B to open the ground connection to wire 139, and to ground the wire 132.

When the switch 20B shifts from the contact 107, the grid 103 is driven negative and the tube 89B becomes non-conductive. At the same time, a negative charge flows through the wire 142 to charge the condenser 143, and to place a short-lived negative bias on the grid 93, rendering the tube 89A momentarily non-conductive. This causes the relay K–4 to de-energize and to drop the arm 29 to the reset coil circuit, by wires 28, arm 29, wire 40, reset coil 35, wire 41, the contact 23, the switch arm 20A and the wire 21. Such circuit momentarily energizes the reset coil, for a period long enough for the projector to be reset to starting position, whereupon the machine is again at rest position, capable of recycling by operation of the starting switch. For when the momentary pulse to the grid 93 ends, the relay K–4 again becomes energized, cocking the advance coil circuit of the projector, the relay K–1 remains energized, holding the motor circuit open, and with the de-energized relay K–3, maintains the bleeder circuit closed, grounding the wire 131.

In operation of the apparatus, means is provided to prevent excessive grid potentials on the grid 117 as a result of modulation of the audio signal to excessive amplitudes. The feed to the grid 117 is through the wire 149. This wire is also connected by a wire 255 to the cathode 256 of the B side of the tube 123. The cathode of this 123B is connected to the potentiometer 129 by the wire 258, which latter applies a predetermined, adjustable, positive potential to the plate 257. Whenever the audio signal delivers a potential to the tube 123*b* in excess of that potentiometer potential, the tube conducts, thus acting to clip away all excessive potential from the grid 117.

The time constant network 247 acts to smooth out the grid potential obtained from the audio message, to provide a fairly constant bias.

The action of the relay K–1 in grounding the grid 103 of the tube 89 when the audio signal is effective, prevents the starting mechanism from having any effect during the delivery of an audio message.

Figure 3:
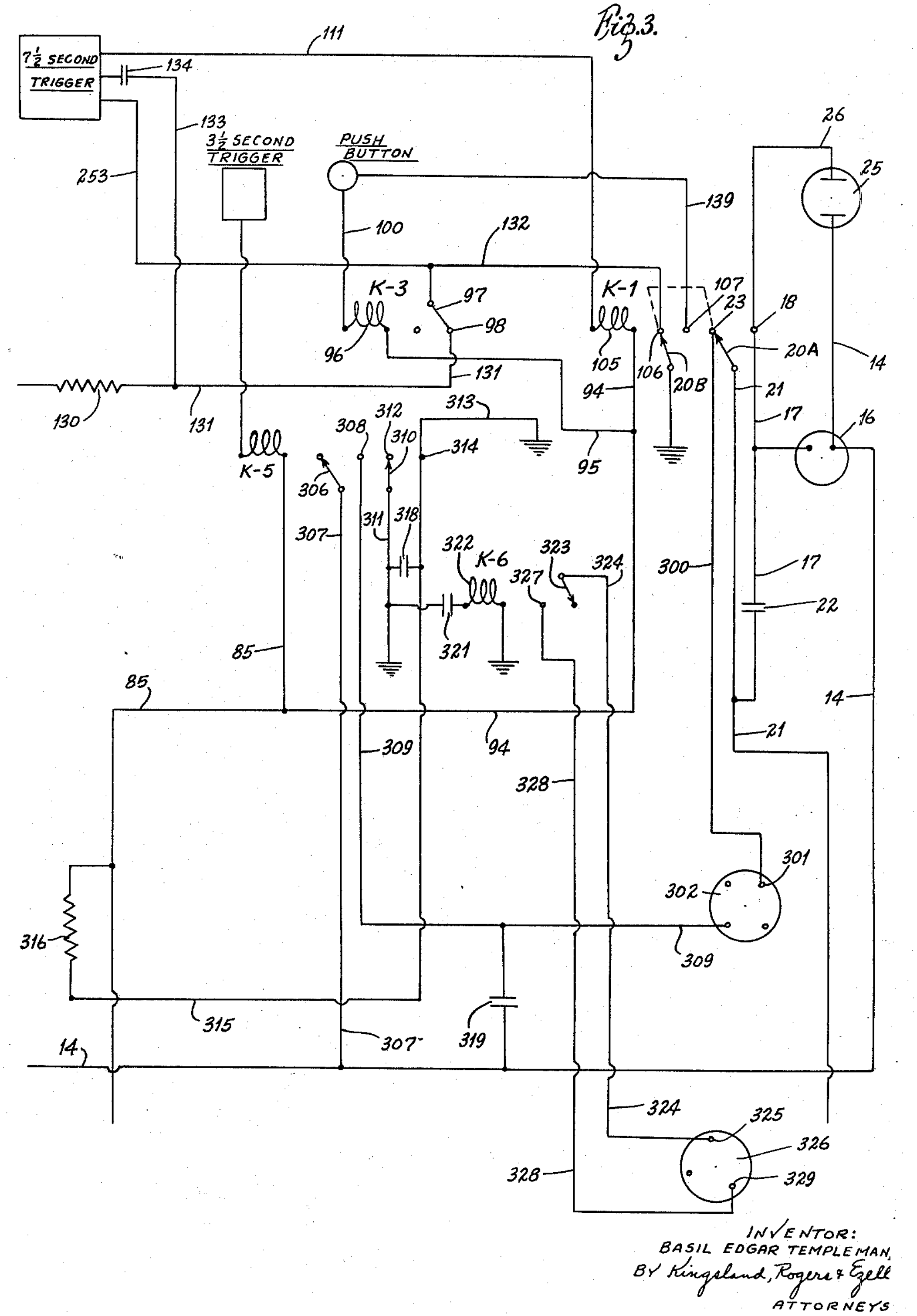
FIGURE 3 is a partial block, partial schematic diagram of another form of the invention.

A modification of the invention is provided as shown in FIGURE 3 and has for its purpose the incorporation of elements into the circuit which will permit the addition of a synchronizing subchassis. The purpose of the synchronizer is to assure correspondence between the audio messages and their appropriate slides being projected.

The essential changes in the modification which are different from the circuitry of FIGURE 2 reside in the construction and connection of the relays. The drawing shows the circuit as depending from certain elements of the block diagram of FIGURE 1. Where the leads are the same as in FIGURE 2, the same numerals have been retained. The features of the circuit which are not shown in FIGURE 3 are identical to those in FIGURE 2 so are not reproduced.

Referring to FIGURE 3, the wire 111 connects to one side of the coil 105 of the relay K–1. The other side of the coil 105 is connected by the wire 94 to the rectified and regulated source as explained in connection with FIGURE 2. The wire 253 connects to the wire 132 which, in turn, connects to the post 106 of the switch 20B. The other post 107 of that switch connects by the wire 139 into the push-button circuit. The switch 20B is connected to ground.

The other switch 20A of the double-pole double-throw relay K–1 is connected to the wire 21 which leads to the power input. One pole 23 of the switch 20A is connected by a wire 300 to a post 301 of the reset socket 302. The other post 18 of the switch 20A has one wire 26 connecting it to the A.C. receptacle 25. The other side of the receptacle 25 is connected by the wire 14 to the motor 16. The wire 14 thereafter connects to the A.C. input as has already been described.

Another wire 17 from the post 18 of the switch 20A connects to the other side of the motor 16. Thereafter, the wire 17 is connected to the wire 21 with a capacitor 22 (.02 mfd.) inserted in the wire 17 between the motor 16 and the connection to the wire 21.

The connections to the relay K–3 are similar to those in the modification in FIGURE 2. The line 100 connects to one side of the coil 96 of the relay K–3. The other side of the coil 96 is connected by the line 95 to the line 94. The switch 97 of the relay K–3 is connected to the juncture of the wires 132 and 253. The wire 131 which is connected to the resistor 130 is also connected to the pole 98 of the switch 97.

In the embodiment of FIGURE 3, the relay which was designated as K–4 in FIGURE 2 is modified to become a double-pole double-throw relay and is accordingly redesignated as K–5. The connections to the coil 305 of the relay K–5 are by the wires 87 and 85, the wire 85 connecting to the wire 94. The switch 306 of the relay K–5 is connected by a wire 307 to the wire 14. One pole 308 of the switch 306 is connected by a wire 309 to a pole of the reset socket 302.

The other switch 310 of the relay K–5 is connected by a wire 311 to ground. One pole 312 of the switch 310 is connected to ground by a wire 313. The other pole 314 is connected by a wire 315 to a resistor 316 (47K to the wire 94). A capacitor 318 (.02 mfd.) is connected between the wires 311 and 315. Another capacitor 319 (.02 mfd.) is connected between the wire 14 and 309, as illustrated.

The switch arm 310 is connected by a wire 320 to one side of a capacitor 321 (20 mfd.). The other side of the capacitor 21 is connected to one side of a coil 322 of a relay K–6. The opposite side of the coil 322 is connected to ground. The switch arm 323 of the relay K–6 is connected by a wire 324 to one pole 325 of a slide control socket 326. A pole 327 of the switch 323 is connected by a wire 328 to another pole 329 of the slide control socket 326.

This description completes the detailed explanation of the modified circuit shown in FIGURE 3. It is to be understood that the circuitry shown in FIGURE 4, which is incorporated into the synchronizing sub-chassis includes plugs for engagement with the sockets of FIGURE 3 so that the circuit of FIGURE 4 can be operated by that of FIGURE 3.

The description of the automatic synchronizing sub-chassis is as follows: A three-pronged plug 350 is designed to fit into the motor receptacle 16. The plug 350 has a relay 351 connected by a wire 352 across two of its terminals so that the wire 352 will make contact with the wires connected to the receptacle 16. The coil 351 is part of a power supply relay which includes a switch 353 in series with one line of the power supply 354. That power supply includes a wire 355 which connects to a pole 356, adjacent the switch arm 353. The switch arm 353 is connected by a wire 357 to one side 358 of a plug receptacle 359. The other side of the power supply 354 is connected by a wire 360 to the plug 361 of the receptacle 359. A plug 370 for receipt within the receptacle 359 has two wires 371 and 372 connected to the projector to transmit power to the same.

A slide control plug 375 is adapted to plug into the slide control socket 326. A wire 376 is connected to one terminal 377 of the plug 375 while a wire 378 is connected to another terminal 379 of the plug 375. The wires 376 and 378 will make contact with the wires 324 and 328 connected to the slide control receptacle 326. The wire 376 is connected to a terminal 380 of a slide holder receptacle 381. The wire 378 is connected to another terminal 382 of the receptacle 381.

A reset plug 385 is adapted to plug into the reset receptacle 302. The receptacle 385 has a reset relay 386 connected across it by a wire 387 which connects to a terminal 388 of the plug 385 and a wire 389 which connects to a terminal 390. The coil 386 is a part of a double-pole single-throw relay which includes two switch arms 391 and 392. A terminal 393 of the switch 391 is connected by a wire 394 to the wire 376. The other terminal 395 of the switch arm 391 is connected by a wire 396 to another terminal 397 of the receptacle 381.

A terminal 398 of the switch 392 is connected by a wire 399 to the terminal 356. The other terminal 400 of the switch arm 392 is connected by a wire 401 to the wire 357. Thus the switch 392 is shunted across the power source 354 while the switch 391 is shunted across the slide control relay 86.

A plug 405 is adapted to be received in the receptacle 381. The plug 405 has a terminal 406 to which a wire 407 is connected. The wire 407 leads to one side of a two-prong plug 408. Another terminal 409 of the plug 405 is connected by a wire 410 to the other side of the two-prong plug 408.

The slide changer means 411 is connected into the wire 410. This slide changer means is illustrated as a coil which may be part of a slide changing relay. The terminals 406 and 409 will be in contact with the terminals 380 and 397 when the plug 405 is received into the receptacle 381.

Another terminal 412 of the plug 405 is connected by a wire 413 to a terminal 414 of a microswitch 415. The other terminal 416 of the microswitch 415 is connected by a wire 417 to the wire 410 so that the slide changer means 411 is in the circuit of the microswitch 415.

A slide holder 418 is illustrated near the microswitch 415. The slide holder 418 and its slides are arranged so that the last slide in the slide holder will have a projection 419 on it to open the microswitch 415 as the last slide moves into projecting position in the slide holder. The terminal 412 of the plug 405 will make contact with the terminal 382 when the plug is received in the receptacle 381.

*Operation of the synchronizing sub-chassis*

The operation of the advance relays and reset relays in the embodiment of FIGURES 3 and 4 is the same as that for the embodiment of FIGURES 1 and 2. However, the relay K–5 includes an additional switch 310, which was not present in the first embodiment described. The switch 310 operates a relay K–6. The relay K–6 is inserted into the circuit as a substitute for a push button operation. The reason for the relay K–6 is to insure that the slide change impulse will not exceed that amount of time necessary for a single slide change. To explain, conventional slide-projectors have a push button slide change operation which, if held down for an extended period of time exceeding that necessary for a single slide change, will cause successive slide changes. The relay K–6, being connected through the capacitor 321 to the switch 310, will remain energized only long enough for a single slide change. That is to say, the capacitor 321 will be connected across the B+ voltage when the relay K–5 is de-energized. When the relay K–5 is energized, the switch arm 310 makes contact with the terminal 312 which immediately discharges the capacitor 321 through the relay coil 322. This energizes that coil 322 for approximately one-half second, long enough for a single slide change, but not long enough for more than one change.

The relay K–6 causes the switch arm 323 to swing over to the contact 327 thereby closing its part of the circuit to the slide control relay 411. This will cause current to pass through the slide change coil 411, providing the switch arm 353 is in contact with the terminal 356. As long as the relay K–1 is de-energized as described in the outline of operation of the modification of FIGURE 1, the switch arm 20–A will be in contact with the terminal 18 so that the motor socket 16 is across the input power source. In this condition, the tape motor will be operating, and the supply power relay 351 will be energized. Therefore, the switch arm 353 will be in contact with the switch terminal 356 so that power is supplied to the projector.

With the microswitch 415 closed on the contact 416, the relay K–6 will cause a slide change during every five seconds pause of the tape transport mechanism. This action has been explained and will continue until the last slide of a series is reached. The last slide will have a projection 419 operated by it to open the contact of the microswitch 415 with its terminal 416. The circuit through the slide changer relay 411 being thus broken, the five second silence time pauses on the tape transport mechanism will be ineffective to operate the slide changer. Therefore, the tape will continue while the slide changing mechanism remains inoperative until the end of a series of tape messages is reached.

The reset voltage occurs in the same manner as previously described with reference to FIGURE 1. That is, the relay K–1 is energized when a ten second silence time is reached on the tape. When the relay K–1 is energized and a voltage applied to the reset socket 302, that voltage is transmitted through the plug 385 to send current through the reset relay 386. This causes the double-pole single-throw relay contact arms 391 and 392 to make contact with their respective poles 393 and 398. The effect of the contact made by the switch 392 with the pole 398 is to shunt the power source 354 (the relay K–1 being energized, the power supply relay 351 is de-energized with the switch arm 353 losing contact with the terminal 356). Therefore, the slide changer relay 411 will again be connected to a source of power through the plug 408 into the projector.

The effect of the contact switch arm 391 with the terminal 393 is to shunt the slide control mechanism. Thus, a circuit is closed which includes the slide changer relay 411 by means of the plug 408, the wire 407, the terminal 406, the terminal 380, the wire 394, the switch 391, the wire 396, the terminal 397, the terminal 409, through the relay 411 and back to the plug 408. Therefore, when the reset relay 386 is energized, the last slide in the slide holder 418 is moved out of projecting position even though the microswitch 415 is open.

The slides and audio messages being then synchronized, the system is conditioned for a renewed operation.

Various changes and modifications may be made within the process of this invention as will be readily apparent to those skilled in the art. Such changes and modifications are within the scope and teaching of this invention as defined by the claims appended hereto.

What is claimed is:

1. In a system of the type described: a signal source and a receiving means; said receiving means being connected to a working mechanism and having first means for advancing said working mechanism a step and second means for resetting said working mechanism; said signal source including means for transmitting a signal corresponding to each step of said working mechanism with at least one silent period having a first duration and at least one silent period having a second duration; valve means connected between said signal source and said receiver; said valve means also being connected to a current source; means responsive to the first duration silent period for causing said valve means to transmit current to said advancing means, and means responsive to the second duration period for causing the valve means to transmit current to said resetting means.

2. A system as in claim 1 including means actuated by said reset means for automatically synchronizing each step of the working mechanism with its corresponding signal.

3. A system as in claim 2 wherein the synchronizing means includes a normally closed switch between it and the working mechanism; said working mechanism incorporating means for opening said switch at the end of a series of steps; said signal source being operable independently of said working mechanism through all of its signals.

4. In a slide projector or the like having input means for automatically advancing the projector to a condition for projecting succeeding slides in accordance with a set of audio messages, one for each slide; means operated by the projector for disengaging the input means from the projector upon the positioning for projection of the last slide of the series; means for continuing the audio messages while the input means is disengaged; and means operated by the source of audio messages after the last one for passing the last slide out of projecting position, thereby conditioning the system for a showing of the series of slides in synchronization with its set of audio messages.

5. In a system of the type described wherein a series of slides are projected in succession according to a corresponding series of audio messages: means actuated by the series of audio messages for causing a slide change according to a first predetermined silent time between the audio messages; means actuated by the series of audio messages for causing the slides to be reset in readiness for a first slide showing according to a second predetermined silent time, different from the first; and means for rendering the slide change means inoperative to effect a slide change when a predetermined slide of the series is in projecting position.

6. The system of claim 5 including means operated by the reset means for rendering the slide change means again effective to cause a slide change.

7. In a slide projector or the like: a slide holder and a series of slides arranged to be successively positioned for projection; means for transmitting a series of audio messages connected electrically to the slide changer; said audio messages having a first silent time between each message and a second silent time at the end of all the messages; an advance relay connected between the transmitting means and the slide holder; a reset relay connected between the transmitting means and the slide holder; a current source for energizing the advance relay and the reset relay; means controlled by said transmitting means for cutting off said current source from the relays during a message transmission, for connecting said current source to the advance relay during said first silent time, and for connecting said current source to the reset relay during said second silent time.

8. The system of claim 7 wherein the last mentioned means includes a control tube between the current source and each relay with the transmitting means being connected to the grid of each control tube, the transmitting means placing a negative bias on the grids during a message presentation, thereby rendering the tubes non-conductive; first timing means for holding the negative bias on the advance relay control tube for a predetermined time less than said first silent time; and second timing means for holding the negative bias on the reset control tube for a predetermined time greater than said first silent period, but less than said second silent period.

9. The system of claim 7 wherein the advance relay is connected in series with a normally closed microswitch; the microswitch being positioned to be opened by one of the slides, thereby rendering the advance relay ineffective to advance the slides; the reset relay including means to short circuit the microswitch whereby the advance relay is again rendered effective.

10. In a slide projector, or the like, having means for automatically advancing a succeeding slide into projecting position in correspondence with a series of audio messages and means for resetting the slides to their initial order at the end of all the messages; means operated by the slides for halting the advance of the slides after a predetermined condition of advancement even while the advancing means continues to operate; and means operated by the resetting means for deactivating the halting means after a predetermined number of messages.

11. In a slide projector or the like having means for automatically advancing a succeeding slide into projecting position in correspondence with a series of audio messages and means for resetting the slides to their initial order at the end of all the messages; means operated by the slides for disengaging the advancing means from the slides; and means operated by the resetting means for reengaging the advancing means; the resetting means having a circuit including the advancing means for short circuiting the disengaging means.

References Cited in the file of this patent

UNITED STATES PATENTS 2,100,434 Davis ---------------- Nov. 30, 1937
2,346,905 Chedister -------------- Apr. 18, 1944

FOREIGN PATENTS 1,096,063 Germany -------------- Dec. 29, 1960